United States Patent [19]

Mochida et al.

[11] Patent Number: 4,458,446
[45] Date of Patent: Jul. 10, 1984

[54] SAFE REMOTE-CONTROL DOOR OPENING-AND-CLOSING DEVICE FOR AN AUTOMOTIVE VEHICLE

[75] Inventors: Haruo Mochida; Mikio Takeuchi, both of Yokohama, Japan

[73] Assignee: Nissan Motor Company, Limited, Kanagawa, Japan

[21] Appl. No.: 360,421

[22] Filed: Mar. 22, 1982

[30] Foreign Application Priority Data

May 20, 1981 [JP] Japan ................... 56-74882

[51] Int. Cl.³ .............................. E05F 15/02
[52] U.S. Cl. ........................... 49/28; 49/31; 49/357; 49/358
[58] Field of Search .............. 49/28, 31, 358, 25, 49/26, 30, 357, 276; 367/909

[56] References Cited

U.S. PATENT DOCUMENTS

| | | | |
|---|---|---|---|
| 3,653,154 | 4/1972 | Hayday | 49/358 X |
| 4,009,476 | 2/1977 | Lutz | 49/31 X |
| 4,084,149 | 4/1978 | Driver et al. | 49/31 X |
| 4,328,540 | 5/1982 | Matsuoka et al. | 49/28 X |
| 4,351,016 | 9/1982 | Felbinger | 49/28 X |

FOREIGN PATENT DOCUMENTS 2072884 3/1980 United Kingdom ............ 49/28

*Primary Examiner*—Kenneth Downey
*Attorney, Agent, or Firm*—Schwartz, Jeffery, Schwaab, Mack, Blumenthal & Koch

[57] ABSTRACT

A safe remote-control door opening-and-closing device for an automotive vehicle by which the door can not be opened or the door now being opened is closed, even if the driver operates the door open switch, in the case where there exists an obstruction within a predetermined warning region near the vehicle door or around the vehicle. The safe remote-control door device according to the present invention comprises an obstruction sensor for detecting the presence of an obstruction, if any, and a switching unit for disconnecting the door open switch from the door driving device or for connecting the door open switch to the reverse revolution terminal of the driving device in order to close the door now being opened, in addition to a conventional remote-control door opening-and-closing device.

15 Claims, 8 Drawing Figures

FIG. 5 (A)
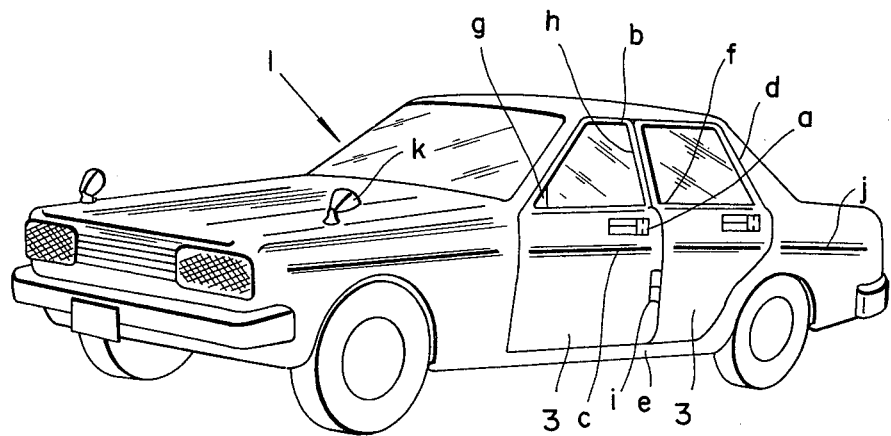
FIG. 5 (C)
FIG. 5 (B)
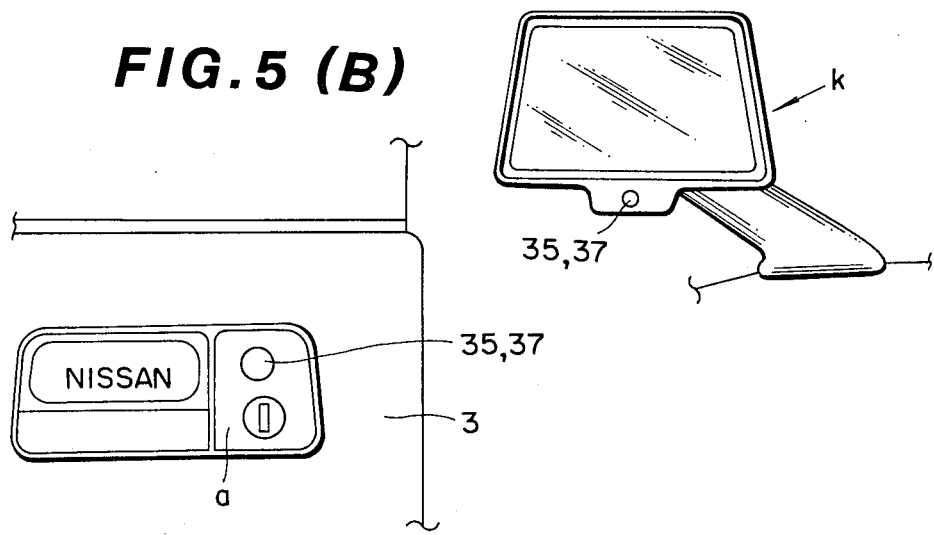

SAFE REMOTE-CONTROL DOOR OPENING-AND-CLOSING DEVICE FOR AN AUTOMOTIVE VEHICLE

BACKGROUND OF THE INVENTION

1. Field of the Invention

The present invention relates generally to a safe remote-control door opening-and-closing device for an automotive vehicle and more specifically to a safety device for opening or closing a vehicle door from a remote position. The safety device according to the present invention includes an obstruction sensor for detecting the presence of an obstruction near the vehicle body, if any.

2. Description of the Prior Art

A remote control door for an automotive vehicle implies a vehicle door which can be opened or closed by the driver, at driver's will, when he operates a control switch disposed at a position remote from the door, irrespective of other passenger's will. The remote control door is usually driven by a door-driving force supplied from a power supply such as an electrical, pneumatic, or hydraulic device.

However, in the case where the driver carelessly operates the door open switch to open the door, there inevitably exists a danger such that a walker or a car approaching from behind the vehicle may be obstructed by the opened vehicle door or may collide with the opened vehicle door, the opened door may hit a person standing near the vehicle or may push down a child. Further, there may arise such an accident that the opened door hits something (such as a road wall, vehicle, building, etc.), with the result that the remote control door open-and-close mechanism is damaged or the vehicle body surface is dented.

As described above, in the prior-art remote control door opening-and-closing device, there exists a problem in that when the door is carelessly opened, various accidents such as collision, injury, damage, etc. may occur due to the opened vehicle door.

SUMMARY OF THE INVENTION

With these problems in mind therefore, it is the primary object of the present invention to provide a safe remote-control door opening-and-closing device for an automotive vehicle, by which where there exists an obstruction within a warning region previously determined near the door or around the vehicle, the door is not opened or the door now being opened is closed, in order to prevent accident due to opening of the door; that is, to improve safety for the remote-control door opening-and-closing device.

To achieve the above-mentioned object, the safe remote-control door opening-and-closing device according to the present invention comprises an obstruction sensor for detecting the presence of an obstruction within a warning region near the door and a switching unit connected in series between a door open switch and a door driving device in order that the door is not opened or a door in the process of being opened is reversely closed when the obstruction detection sensor outputs a signal to the switching unit, in addition to the conventional remote-control door opening-and-closing device.

BRIEF DESCRIPTION OF THE DRAWINGS

The features and advantages of the safe remote-control door opening-and-closing device according to the present invention will be more clearly appreciated from the following description taken in conjunction with the accompanying drawings in which like reference numerals designate corresponding elements and in which;

FIG. 5(A) is a perspective view of an automotive vehicle, which shows various positions at which an ultrasonic pulse transmitter and an ultrasonic pulse receiver are mounted;

FIG. 5(B) is an enlarged front view of an escutcheon portion of an outside door handle on which ultrasonic pulse transmitter and receiver are mounted together;

FIG. 5(C) is an enlarged front view of an outside rear view mirror on which ultrasonic pulse transmitter and receiver are mounted together;

DETAILED DESCRIPTION OF THE PREFERRED EMBODIMENTS

With reference to the attached drawings, there will be described hereinbelow embodiments of the safe remote-control door opening-and-closing device according to the present invention. Further, in this specification, only the safe remote-control device used for the left side vehicle doors is disclosed by way of example; however, it is of course possible to adapt this safe remote-control device according to the present invention for the right side vehicle doors, in particular, in the case where the vehicle travels on "Keep-to-the-right" roads.

Figure 1:
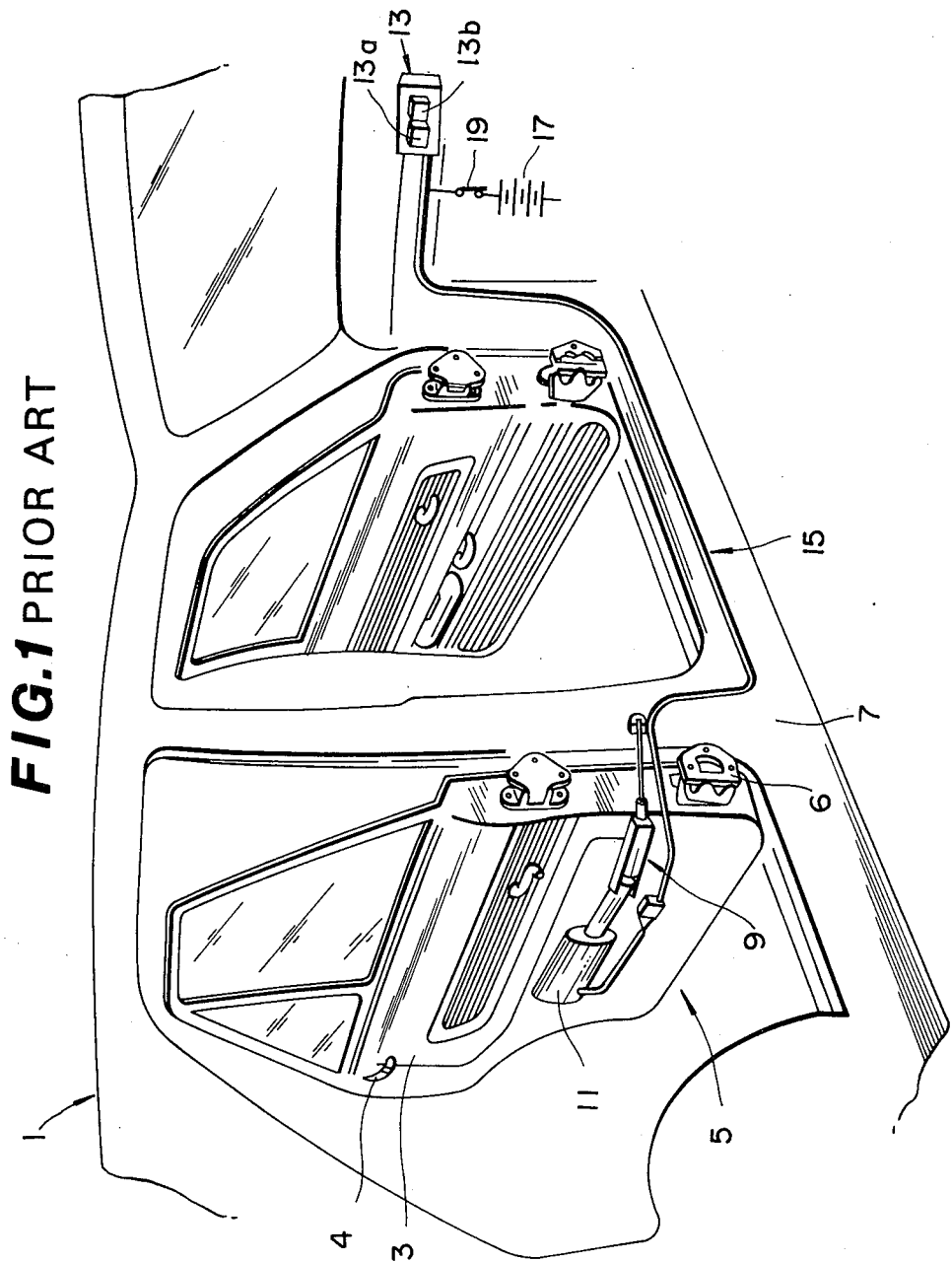
FIG. 1 is a pictorial view showing a conventional remote control door opening-and-closing device mounted on the inside of an automotive vehicle rear door.

FIG. 1 helps to illustrate the principle of a prior-art remote-control door opening-and-closing device provided on a rear door 3 on a vehicle 1.

The remote control door device 5 mainly comprises a door open-and-close mechanism 9 such as a hydraulic cylinder linked between the door 3 and a vehicle body 7 for opening and closing the door 3, a driving device 11 such as a DC motor for selectively driving the open-and-close mechanism 9 in the normal direction or in the reverse direction, and a control unit 15 including connecting cables for selectively operating the driving device 11 clockwise or counterclockwise. Further, in FIG. 1, the reference numeral 13 denotes a door open-and-close switch having a door open switch 13a and a door close switch 13b, the reference numeral 17 denotes a battery, and the reference numeral 19 denotes an ignition switch.

In the remote control door device 5 thus constructed, when a driver selectively operates the door open and close switches 13a and 13b, the door 3 is opened or closed, respectively, in response to these switches.

When the door 3 is opened by remote control, since a door lock and a striker (both not shown) engage each time the door is closed, the unlock lever 4 linked to the door open-and-close mechanism 9 must disengage the door lock from the striker, and then the driving device 11 can push the door 3 outward with a hinged portion 6 acting as a fulcrum, by means of the door open-and-close mechanism 9. Also, when the door 3 is closed by remote control, since the door 3 moves into with the passenger compartment wall, the door lock and the striker automatically engage and therefore the door is locked.

Figure 2:
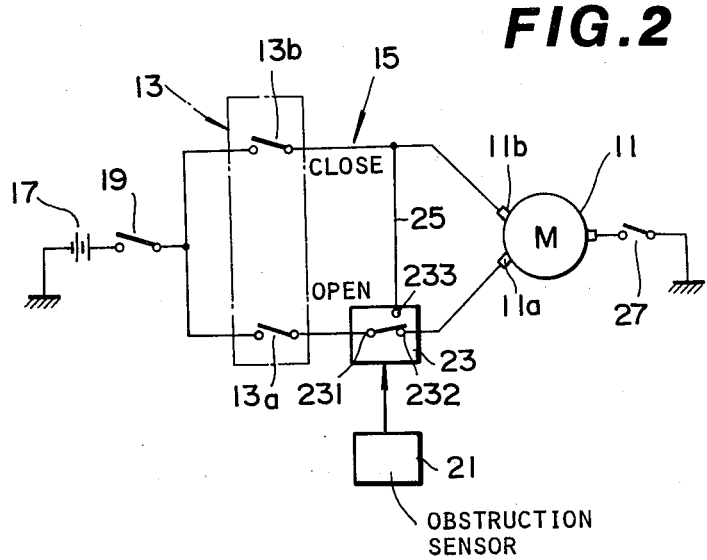
FIG. 2 is a schematic block diagram of an embodiment of the control unit of the safe remote-control door opening-and-closing device according to the present invention.

FIG. 2 is an example embodiment of the control unit 15 according to the present invention used with the remote-control door opening-and-closing device thus constructed, in which there is connected a switching unit 23 and an obstruction sensor 21, in addition to the conventional control unit.

As shown in FIG. 2, since the driving device 11 such as a DC motor includes a normal revolution terminal 11a and a reverse revolution terminal 11b, the door open-and-close switch 13 is connected between an ignition switch 19 connected to a battery 17 and the driving device 11 via the door open switch 13a and the door close switch 13b, respectively.

The two contacts 231 and 232 of the switching unit 23 are connected in series between the door open switch 13a of the door open-and-close switch 13 and the normal revolution terminal 11a of the driving device 11, and further the contact 233 of the switching unit 23 is connected to a point between the door close switch 13b of the door open-and-close switch 13 and the reverse revolution terminal 11b of the driving device 11 via a wire 25.

The switching unit 23 is switched from the contact 232 to the contact 233, when the obstruction sensor 21 detects the existence of an obstruction within a warning region near the door and, therefore, a signal is outputted from the obstruction sensor 21 to the switching unit 23.

That is to say, when the obstruction sensor 21 detects an obstruction, the door open switch 13a is disconnected from the normal revolution terminal 11a of the driving device 11 and is connected to the reverse revolution terminal 11b of the driving device 11. Further, in FIG. 2, the reference numeral 27 denotes a door open-and-close stopper switch turned off when the door is fully opened or fully closed.

Now follows a description of the operation of this embodiment according to the present invention with reference to FIGS. 1 and 2.

First, in the case where the sensor 21 detects that there is no obstruction within a warning region near the door 3, for instance, there is no moving object such as a walker within a predetermined area on the rear side of the door or there is no object such as a vehicle within a predetermined area on the side of the door (within a range over which the door is moved), the switching unit 23 connects the door open switch 13a to the normal revolution terminal 11a of the motor 11. Therefore, when the door open switch 13a is closed while the ignition switch 19 is on, since a voltage is supplied from the battery 17, through the ignition switch 19, the door open switch 13a, the switching unit 23, the normal revolution terminal 11a of the motor 11, the stopper switch 27, to ground, a current is passed through the normal revolution terminal 11a of the motor 11 in order to open the door 3 by means of the door open-and-close mechanism 9. Next, when the door close switch 13b is turned on, since a voltage is supplied from the battery 17, through the ignition switch 19, the door close switch 13b, the reverse revolution terminal 11b of the motor 11, and the stopper switch 27, to ground, a current is passed through the reverse revolution terminal 11b of the motor 11 in order drive the motor in the reverse direction, with the result that the door 3 is closed.

Next, in the case where the sensor 21 detects that there is an obstruction within a warning region near the door 3, the switching unit 23 is switched, so that the door open switch 13a is disconnected from the normal revolution terminal 11a of the motor 11. Therefore, in this case, even if the driver turns on the door open switch 13a by mistake or without confirming safety near the door, no current is passed through the normal revolution terminal 11a of the motor 11, so that the door 3 is not opened. Thus, it is possible to previously prevent an accident such that an object approaching from the rear collides against the opened door 3, or the door hits a person or an object on the door side, thus avoiding any injury of other persons, and any damage to the door or other objects.

Additionaly, in this embodiment, in the case where the obstruction sensor 21 detects an obstruction while the door 3 is being opened, it is possible to reversely close the door 3 which is now being opened. That is to say, in the case when a moving object approaching the door from the rear side thereof is not yet within the warning region when the driver turns on the door open switch 13a but comes within the warning region after the door 3 has begun opening, since the obstruction sensor 21 detects the presence of an obstruction and, thus, the switching unit 2 is switched in such a way that the door open switch 13a is disconnected from the normal revolution terminal 11a of the motor 11 and is connected to the reverse revolution terminal 11b of the motor 11, the current flowing through the normal revolution terminal 11a of the motor 11 is supplied to the reverse revolution terminal 11b of the motor 11 via the line 25 after the switching unit 23 has been switched.

Therefore, the motor 11 is driven in the reverse direction, with the result that it is possible to reversely close the door 3 which is now being opened in order to prevent a moving object approaching the door 3 from the rear from colliding against the opened door 3.

Further in this embodiment, it is possible to construct the above-mentioned switching unit 23 in such a way that when the obstruction sensor 21 detects an obstruction, the door open switch 13a is simply disconnected from the normal revolution terminal 11a of the motor 11. In this case, it is possible to stop the door from opening in the same manner as described above; however, in the case where an obstruction is detected by the obstruction sensor while the door 3 is being opened, the door 3 which is currently being opened can be stopped at the current position. Therefore, it is also possible to previously prevent a contact accident due to the opened door 3.

Figure 3:
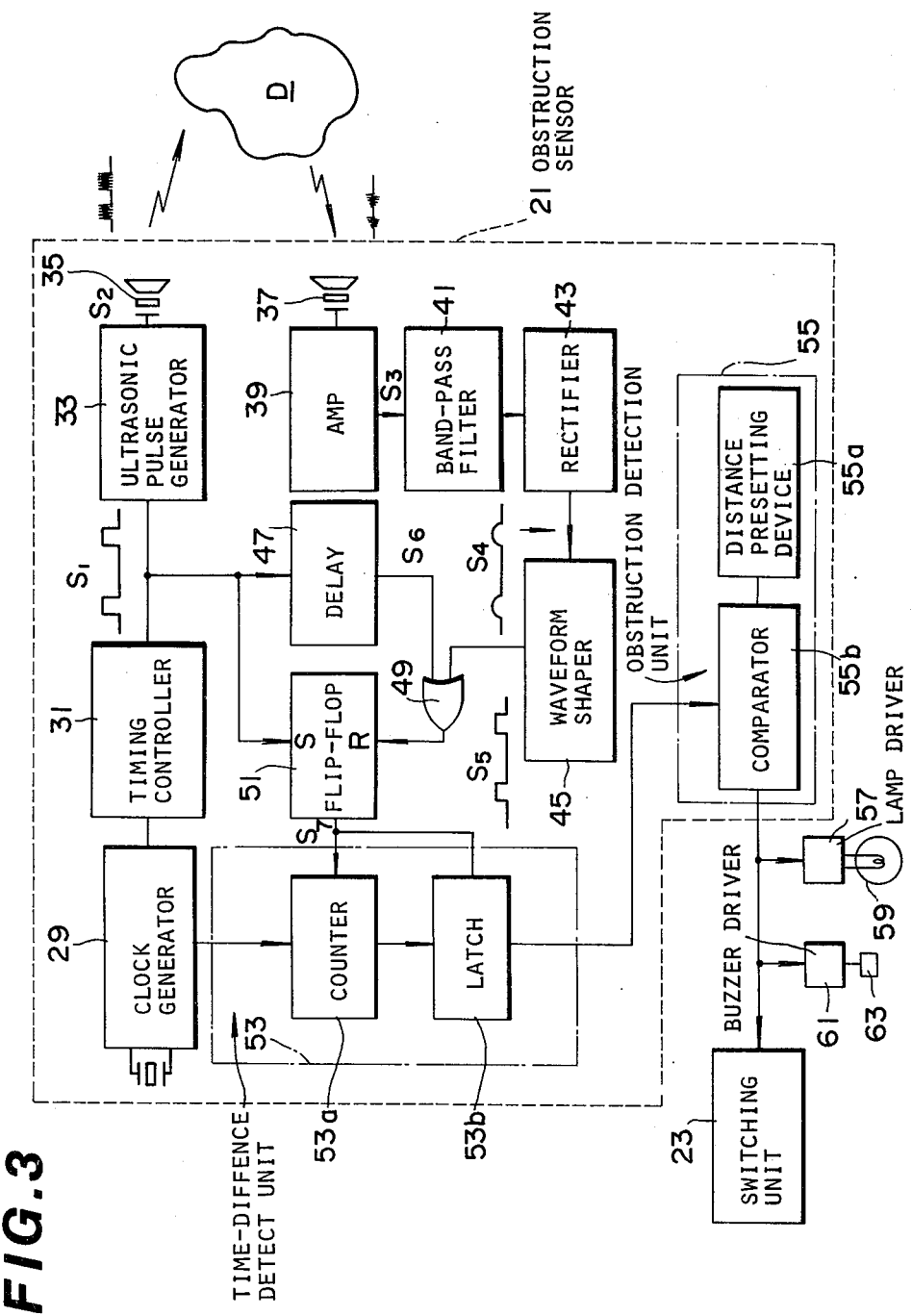
FIG. 3 is a schematic block diagram of an example obstruction detection sensor used with the safe remote-control door opening-and-closing device according to the present invention.

FIG. 3 is a schematic block diagram of the above-mentioned obstruction sensor 21. In the figure, the reference numeral 29 denotes a clock signal generator for generating a reference clock signal, the numeral 31 denotes a transmission timing controller for determining a pulse width W and a transmission interval T of an ultrasonic pulse signal in accordance with the clock signal generated from the clock signal generator 29, the reference numeral 33 denotes an ultrasonic pulse generator for generating a high frequency ultrasonic signal only while the transmission timing controller 31 outputs a H(High)-voltage level signal, the numeral 35 denotes an ultrasonic pulse transmitter such as a magnetostriction element for producing ultrasonic wave signals in response to the high frequency signal generated from the ultrasonic pulse generator 33.

The clock signal generator 29, the transmission timing controller 31, the ultrasonic pulse generator 33 and the ultrasonic pulse transmitter 35 are configured together within a signal transmitting unit.

Figure 4:
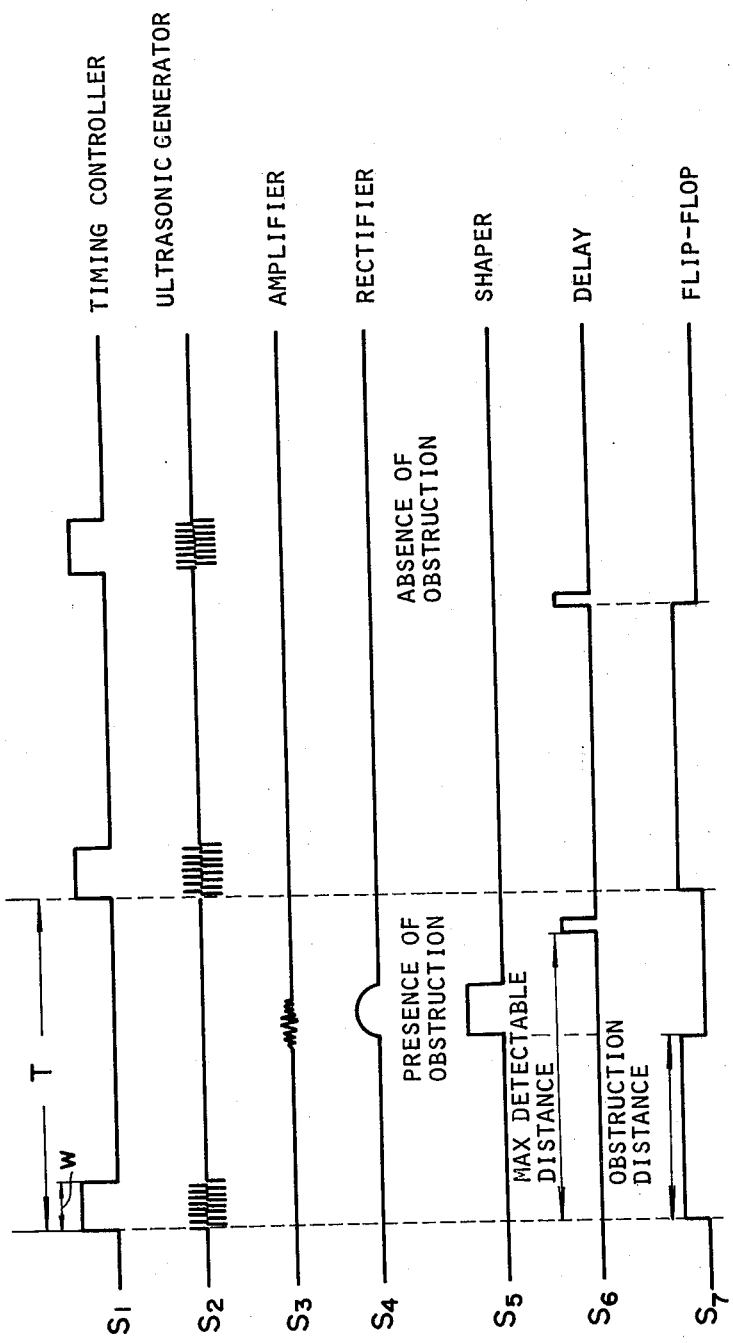
FIG. 4 is a timing chart showing various signal waveforms at various positions in the schematic block diagram of FIG. 3.

FIG. 4 shows an output signal waveform $S_1$ generated from the transmission timing controller 31, and an output signal waveform $S_2$ generated from the ultrasonic pulse generator 33.

An ultrasonic pulse signal intermittently transmitted from the ultrasonic pulse transmitter 35 is reflected from an obstruction D near the door 3 and, next, is received by an ultrasonic pulse receiver 37, and converted into a voltage signal. The received ultrasonic pulse signal thus obtained is amplified by an amplifier 39, and only the frequency elements included in the transmitted ultrasonic wave signal are selected via a band-pass filter 41, rectified through a rectifier 43, and next waveform-shaped via a waveform shaper 45 such as a Schmitt-trigger circuit, in order to change the waveform of the signal into a rectangular wave. Additionally, FIG. 4 shows the respective output signal waveforms $S_3$, $S_4$ and $S_5$ of the amplifier 39, the rectifier 43 and the waveform shaper 45, respectively.

In FIG. 3, the reference numeral 47 denotes a delay circuit for delaying the signal $S_1$ generated from the transmission timing controller 31 by a time period corresponding to a maximum detectable distance, the numeral 49 denotes an OR gate, and the numeral 51 denotes a flip-flop which is set by the leading edge of the signal $S_1$ generated from the transmission timing controller 31 and is reset by the leading edge of the signal $S_5$ generated from the waveform shaper 45 in the case of the presence of an obstruction or the signal $S_6$ generated from the delay circuit 47 in the case of the absence of an obstruction. The signal waveform $S_6$ generated from the delay circuit 47 and the signal waveform $S_7$ generated from the flip-flop 51 are both depicted in FIG. 4, respectively.

The reference numeral 53 denotes a time-difference detection unit for measuring a difference in time between the transmitted ultrasonic pulse signal and the received ultrasonic pulse signal, that is, for measuring the pulse width of the signal $S_7$ outputted from the flip-flop 51 in order to measure a distance to an obstruction. This time-difference detection unit 53 includes a counter 53a and a latch circuit 53b.

In more detail, whenever the signal $S_1$ is applied from the transmission timing controller 31 to the set terminal S of the flip-flop 51, since the leading edge of the signal $S_1$ sets the flip-flop 51, the signal $S_7$ from the flip-flop 51 starts the counter 53a counting the reference clock signal generated from the clock generator 29 the instant the flip-flop 51 is set ($S_7$ changes to an H-voltage level). On the other hand, whenever the signal $S_5$ or $S_6$ is applied from the OR gate 49 to the reset terminal R of the flip-flop 51, since the leading edge of the signal $S_5$ or $S_6$ resets the flip-flop, the signal $S_7$ from the flip-flop 51 stops the counter 53a from counting the reference clock signal the instant the flip-flop 51 is reset ($S_7$ changes to an L-voltage level).

The number of the clock signals counted by the counter 53a indicates the pulse width of the signal $S_7$ generated from the flip-flop 51, that is, a distance from the obstruction sensor 21 to an obstruction D. The counted clock signal value is next held in the latch circuit 53b from when the flip-flop is set to when the flip-flop is reset.

The reference numeral 55 denotes an obstruction detection unit for detecting whether or not there is an obstruction D within a predetermined warning region near the door 3 in response to the output signal from the time-difference detection unit 53, which comprises a distance presetting device 55a for presetting any given distance and a digital comparator 55b for comparing a signal representative of a distance preset by the distance presetting device 55a with another signal representative of a distance to the obstruction D which is outputted from the latch circuit 53b. When a distance to the obstruction D is less than a preset distance, the output signal from the digital comparator 55b, that is, the output signal from the obstruction sensor 21 becomes, for instance, L(Low)-voltage level.

The output signal from the obstruction sensor 21 thus configured is applied to the above-mentioned switching unit 23, and when an L-voltage level output signal is applied from the obstruction sensor 21, the door open-and-close switch 13 is controlled as already described.

Further, the reference numeral 57 denotes a warning lamp driver to which the output signal from the obstruction sensor 21 is applied, the numeral 59 denotes an obstruction detection indicator lamp, the reference numeral 61 denotes a buzzer driver to which the output signal from the obstruction sensor 21 is also applied, and the numeral 63 denotes a buzzer.

Now, follows a description of the operations of the obstruction sensor 21 shown in FIG. 3.

Assumption is made that a maximum detectable distance within the warning region to be preset near the door 3 is 2 m, and the minimum distance resolving power by the counter 53a is 0.1 m. Then, the minimum oscillation frequency generated from the clock signal generator 29 is as follows:

$$\frac{340 \text{ m/sec}}{0.1 \text{ m} \times 2} = 1.7 \text{ KH}_Z$$

because one pulse signal must be counted within a time period required for an ultrasonic wave signal to go and return a distance of 0.1 m.

A time required to go and return a maximum detectable distance of 2 m is $$T = \frac{2 \times 2}{340 \text{ m/sec}} \approx 0.012 \text{ sec}$$

Therefore, the pulse interval T of the ultrasonic pulse signal must be more than 0.012 sec.

If the frequency of the ultrasonic signal to be used is 50 KH$_Z$ and if ten ultrasonic pulse waves are included within a pulse width W, the pulse width W must be determined as:

$$W = \frac{10}{50 \times 10^3} = 0.0002 \text{ sec}$$

Accordingly, when the above-mentioned door open switch 13a is closed while the ignition switch 19 is kept turned on, the power supply (battery 17) is also applied to the obstruction sensor 21 and the lamp or buzzer driver 57 or 61, (although not shown in FIGS. 2 and 3) so that the obstruction sensor 21 starts transmitting and receiving the ultrasonic wave.

In more detail, on the basis of the reference clock signal generated from the clock signal generator 29, the transmission timing controller 31 generates a signal $S_1$ whose pulse width is W and whose pulse interval is T, as determined on the basis of the above calculations. Receiving this signal $S_1$, the pulse generator 33 generates an ultrasonic pulse signal $S_2$, in which the ultrasonic signals are included only while the signal $S_1$ outputs a H-voltage level signal.

As a result, an ultrasonic pulse signal $S_2$ is transmitted from the ultrasonic pulse transmitter 35. When this ultrasonic pulse signal is reflected from the obstruction D, the reflected ultrasonic wave is received by the ultrasonic pulse receiver 37 and is next converted into a voltage corresponding thereto.

After being amplified into the signal $S_3$ through the amplifier 39, being filtered through the band-pass filter 41, and next being rectified into the signal $S_4$ through the rectifier 43, the reflected ultrasonic signal is applied to the waveform shaper 45. This waveform shaper 45 serves to change the dull-waveform signal after rectification into a sharp-waveform rectangular signal. This waveform-shaped signal $S_5$ is next applied to the reset terminal R of the flip-flop 51 via the OR gate 49.

On the other hand, since a signal $S_1$ is being applied from the transmission timing controller 31 to the set terminal S of the flip-flop 51, the flip-flop 51 can output a signal corresponding to a difference in time between transmitted signal and received signal. As a result, as described already, the time-difference detection unit 53 outputs a signal corresponding to a distance to the obstruction D. In this embodiment, since the counter 53a counts the number of the reference clock signals to measure the time-difference, it is possible to determine the resolving power to be 0.1 m by designing the sensor system in such a way that one ultrasonic pulse signal $S_2$ is generated each time the signal goes and returns a distance of 0.1 m.

The obstruction detection unit 55 determines whether or not the time-difference measured and held in the time-difference detection unit 53, that is, the distance to the obstruction D is within a distance preset by the distance presetting device 55a, that is, the warning region near the door to be watched. If the distance to the obstruction D is within the warning region, the digital comparator 55b outputs, for instance, an L-voltage level signal. When this L-voltage level output signal from the obstruction sensor 21 is applied to the switching unit 23, the switching unit 23 is switched to stop the door 3 from being opened or to switch the door 3 so as to be closed. Further, in this embodiment, in order to indicate to the driver that there exists the obstruction D within the predetermined warning region near the door, the obstruction detection indicator lamp 59 comes on and the buzzer 63 begins to generate an alarm sound; therefore, the driver who turns on the door open switch 13a readily knows that the door can not be opened or is being closed reversely due to the presence of the obstruction D.

Further, in the above operations, in the case where there exists no obstruction within the maximum detection distance (2 m in this embodiment), the pulse signal $S_6$ delayed via the delay circuit 47 is given to the flip-flop 51 via the OR gate 49 before the reflected and received ultrasonic pulse signal $S_5$ is given to the flip-flop 51. Therefore, the flip-flop 51 is reset by this delayed pulse signal $S_6$. As a result, the counter 53a of the time-difference detection unit 53 counts the number of the reference clock signals from when the ultrasonic pulse signal $S_2$ is outputted to set the flip-flop 51 to when the delayed pulse signal $S_6$ is outputted to reset the flip-flop. In this case, however, since the counted value corresponds to a maximum detectable distance, the value of the signal outputted from the latch circuit 53b is always greater than that preset by the distance preset device 55a. Therefore, the output signal from the comparator 55b, which is obtained by comparing the output signal from the latch circuit 53b with the output signal from the distance presetting device 55a, assumes, for instance, an H-voltage level, indicating the absence of obstruction D within the predetermined warning region near the door, with the result that it is possible to normally open the door by turning on the door open switch 13a.

Now, various example arrangements of the above-mentioned ultrasonic pulse transmitter 35 and the ultrasonic pulse receiver 37, and the warning regions near the door, will be described with reference to FIGS. 5–8.

FIGS. 5(A)–5(C) show representative positions where the ultrasonic pulse transmitter 35 and ultrasonic pulse receiver 37 are mounted on the vehicle 1. In FIG. 5(A), the symbol a designates an outside handle escutcheon, the symbol b designates a sash moulding, the symbol c designates a door guard moulding, the symbol d a rear pillar finisher, the symbol e designates a sill moulding, the symbol f designates a door waist moulding, the symbol g designates a sash corner piece, the symbol h designates a sash moulding, the symbol i designates a door guard protector, and the symbol j designates a body side-guard moulding. These outside handle escutcheon a, sill moulding e, etc. are attached on the outside of the door 3 in which the automatic door device is installed.

FIG. 5(B) is a fragmentary enlarged view showing a case where the ultrasonic pulse transmitter 35 and the ultrasonic pulse receiver 37 are mounted on the outside handle escutcheon a on the door 3.

FIG. 5(C) shows a case where the ultrasonic pulse transmitter 35 and the ultrasonic pulse receiver 37 are disposed on the housing k of an outside rear-view mirror attached on the side where the remote-control door device is disposed.

However, without being limitted to special positions on a vehicle body, it is possible to mount the ultrasonic pulse transmitter and receiver at any desired positions on the basis of the predetermined warning region near the door or the vehicle body.

Figure 6:
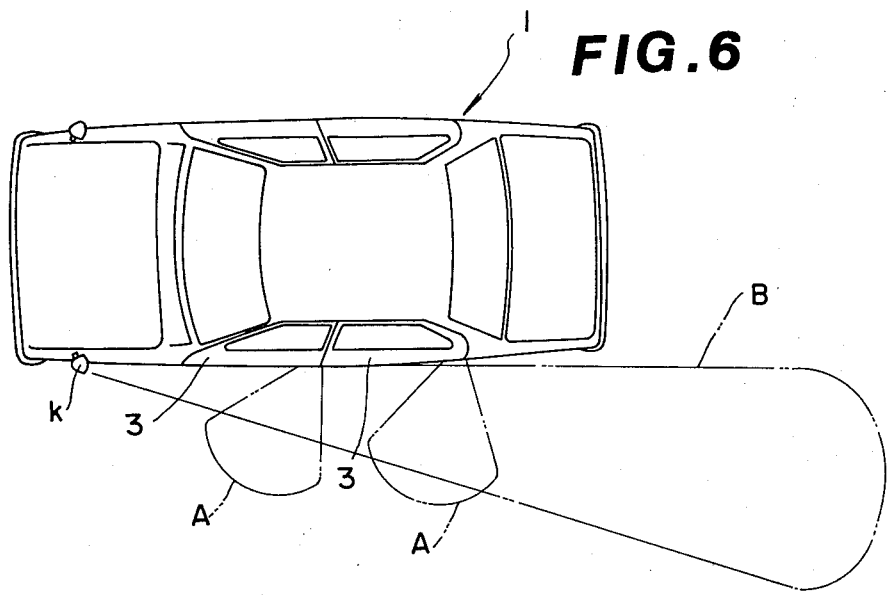
FIG. 6 is a top view of an automotive vehicle showing an example warning region near and behind the vehicle.
Figure 7:
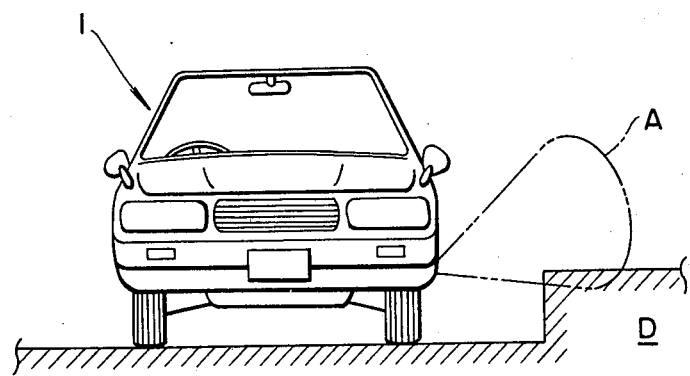
FIG. 7 is a front view of an automotive vehicle showing an example warning region beside the vehicle door.
Figure 8:
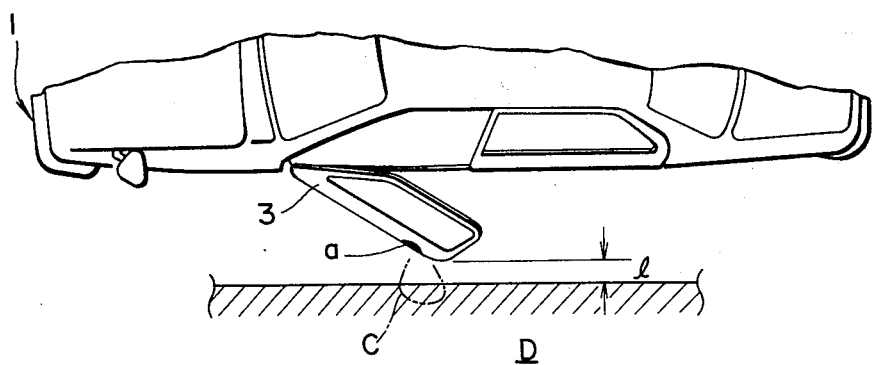
FIG. 8 is a fragmentary top view of an automotive vehicle showing another example warning region near the opened door end.

FIGS. 6–8 show representative warning regions. FIG. 6 shows the warning region A determined in the case where the ultrasonic pulse transmitter 35 and the ultrasonic pulse receiver 37 are mounted on the sill moulding e and the warning region B determined in the case where the ultrasonic pulse transmitter 35 and the ultrasonic pulse receiver 37 are mounted on the outside rear-view mirror k. In the above-mentioned warning regions A and B, the characteristic such that ultrasonic signal propagates under a relatively-large directivity is desirable. Further, as the warning region predetermined near the door, it is possible to determine not only the warning region over which the door is opened but also, or additionally where necessary, the warning region including other phantom walkers or bicycles having a high possibility of collision against their door when the forward course is obstructed by the opened door.

FIG. 7 shows the case where the above-mentioned warning region A is seen from the front side of the vehicle 1. In such a warning region A, the warning distance from the vehicle body to the obstruction D is about 1-1.5 m, so that when the obstruction sensor 21 detects the presence of the obstruction D within the warning region A, the door will not be opened even if the door open switch 13a is turned on.

FIG. 8 shows the case where the ultrasonic pulse transmitter 35 and the ultrasonic pulse receiver 37 are mounted on, for instance, the outside handle escutcheon a of the door 3 of the vehicle 1. In such a warning region C, the warning distance is about 40-50 cm.

In this embodiment, although the door 3 is opened when the driver turns on the door open switch 13a, when the distance l between the door and the obstruction D becomes smaller and smaller and finally below a predetermined warning distance, the obstruction sensor 21 detects the presence of the obstruction D within the warning region C. Therefor, in this embodiment, even if the above-mentioned switching unit 23 is constructed in such a way that the door open switch 13a is only disconnected from the normal revolution terminal 11a of the motor 11, the door stops from further being opened at a position where the sensor 11 detects the presence of an obstruction.

Further, it is possible to use a relay or a thyristor etc. for the above-mentioned switching unit 23.

As described above, in the safety device for a remote-control vehicle door opening-and-closing device according to the present invention, since the switching unit is connected in series with the door open switch of the control unit for controlling the driving device for operating the door open-and-close mechanism, and since this switching unit is switched in response to a signal generated from the obstruction sensor for detecting the presence of an obstruction positioned within a predetermined warning region near the door in order to disconnect the door open switch from the driving device or to operate the driving device in the reverse direction, in case of the presence of an obstruction, it is possible to stop the door from being opened, to stop the door which is currently being opened from further being opened, or to close the door which is being opened, thus preventing an accident due to the opening of door and improving the safety for the remote control door, without injury of a walker, damage of the door itself, or damage of the other person's object.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A safe remote-control door opening-and-closing device for an automotive vehicle for opening or closing a vehicle door from a remote position when there is no obstruction near or behind the vehicle, which comprises:
   (a) a door open-and-close mechanism linked to the vehicle door for opening and closing the vehicle door;
   (b) a driving device linked to said door open-and-close mechanism for driving said door open-and-close mechanism, said driving device being provided with a normal revolution terminal and a reverse revolution terminal;
   (c) a door open switch connected in series with the normal revolution terminal of said driving device for operating said driving device, when closed, in the normal direction that the door is opened;
   (d) a door close switch connected in series with the reverse revolution terminal of said driving device for operating said driving device, when closed, in the reverse direction that the door is closed;
   (e) an obstruction sensor mounted on a vehicle body portion for detecting the presence of an obstruction within a warning region near the vehicle door prior to contact between the obstruction and the vehicle door and for outputting a first signal when said obstruction sensor detects no obstruction and a second signal when said obstruction sensor detects an obstruction; and
   (f) a switching unit having:
      (1) a first contact connected to said door open switch; and
      (2) a second contact connected to the normal revolution terminal of said driving device, said first contact being closed to said second contact in response to the first signal from said obstruction sensor indicative of the absence of an obstruction within the warning range near the vehicle, and being opened from said second contact in response to the second signal from said obstruction sensor indicative of the presence of an obstruction within the warning range near the vehicle, whereby the vehicle door can be opened, when said door open switch is closed, in the case of the absence of an obstruction, but not opened, even if said door open switch is closed, in the case of the presence of an obstruction.

2. A safe remote-control door opening-and-closing device for an automotive vehicle as set forth in claim 1, wherein said switching unit further comprises a third contact connected to the reverse revolution terminal of said driving device, said third contact being opened from said first and second contacts in response to the first signal from said obstruction sensor indicative of the absence of an obstruction within the warning range near the vehicle, and being closed to said first contact in response to the second signal from said obstruction sensor indicative of the presence of an obstruction within the warning range near the vehicle, whereby the vehicle door can be opened, when said door open switch is closed, in the case of the absence of an obstruction, but the vehicle door is not opened or the vehicle door now being opened is reversely closed, when said door open switch is closed, in the case of the presence of an obstruction.

3. A safe remote-control door opening-and-closing device for an automotive vehicle as set forth in either claim 1 or 2, wherein said obstruction sensor comprises:

(a) ultrasonic transmission means for transmitting an ultrasonic pulse signal;

(b) ultrasonic receiving means for receiving the ultrasonic pulse signal transmitted from said ultrasonic transmission means and reflected from an obstruction within the warning range near the vehicle, if any;

(c) time-difference detection means for detecting a time difference from when said ultrasonic transmission means transmits an ultrasonic pulse signal to when said ultrasonic receiving means receives the reflected ultrasonic pulse signal; and (d) obstruction determination means for determining whether or not there is an obstruction within the warning range near the vehicle in response to the signal generated from said time-difference detection means, and for outputting the first signal to said switching unit when said obstruction determination means determines that there is no obstruction and the second signal to said switching unit when said obstruction determination means determines that there is an obstruction.

4. A safe remote-control door opening-and-closing device for an automotive vehicle as set forth in claim 3, wherein said ultrasonic transmission means comprises:

(a) a clock signal generator for generating a reference clock signal;

(b) a transmission timing controller connected to said clock signal generator for outputting a transmission timing pulse signal $S_1$ having a pulse width W and pulse intervals T on the basis of the reference clock signal;

(c) an ultrasonic pulse generator connected to said transmission timing controller for outputting a pulse signal $S_2$ including ultrasonic signals only during the time period W in accordance with the transmission timing pulse signal $S_1$; and (d) an ultrasonic pulse transmitter connected to said ultrasonic pulse generator for transmitting the ultrasonic pulse signal $S_2$.

5. A safe remote-control door opening-and-closing device for an automotive vehicle as set forth in claim 4, wherein said ultrasonic receiving means comprises:

(a) an ultrasonic pulse receiver for receiving the ultrasonic pulse signal $S_2$ transmitted from said ultrasonic pulse transmitter and reflected from an obstruction and for outputting a signal corresponding thereto;

(b) an amplifier connected to said ultrasonic pulse receiver for amplifying the signal from said ultrasonic pulse receiver and for outputting a signal $S_3$ corresponding thereto;

(c) a band-pass filter connected to said amplifier for filtering the signal $S_3$ outputted from said amplifier and for outputting a signal corresponding thereto;

(d) a rectifier connected to said band-pass filter for rectifying the signal from said band-pass filter and for outputting a signal $S_4$ corresponding thereto; and (e) a waveform shaper connected to said rectifier for waveform-shaping the signal $S_4$ from said rectifier and for outputting a pulse signal $S_5$ corresponding thereto.

6. A safe remote-control door opening-and-closing device for an automotive vehicle as set forth in claim 5, wherein said time-difference detection means comprises:

(a) a flip-flop the set terminal S of which is connected to said transmission timing controller to set said flip-flop in accordance with the signal $S_1$ transmitted from said transmission timing controller and the reset terminal R of which is connected to said waveform shaper to reset said flip-flop in accordance with the signal $S_5$ outputted from said waveform shaper, said flip-flop outputting a signal $S_7$ corresponding thereto;

(b) a counter connected to said clock signal generator and said flip-flop for counting the clock signal during a time period from when said flip-flop is set to when said flip-flop is reset; and (c) a latch circuit connected to said counter and said flip-flop for holding a signal indicative of the time value counted by said counter, said latch circuit being reset when said flip-flop is reset.

7. A safe remote-control door opening-and-closing device for an automotive vehicle as set forth in claim 6, wherein said obstruction determination means comprises:

(a) a distance presetting device for presetting a given distance indicating a required warning region near the vehicle and for outputting a signal corresponding thereto;

(b) a comparator connected to said distance presetting device and said latch circuit for comparing the signal from said latch circuit with the signal from said distance presetting device and for outputting the first signal indicative of the absence of an obstruction when the time signal outputted from said latch circuit is more than the time signal outputted from said distance presetting device and the second signal indicative of the presence of an obstruction when the time signal outputted from said latch circuit is equal to or less than the time signal outputted from said distance presetting device.

8. A safe remote-control door opening-and-closing device for an automotive vehicle as set forth in claim 5, which further comprises:

(a) a delay circuit connected to said transmission timing controller for delaying the leading edge of the signal $S_1$ outputted from said transmission timing controller by a time period which corresponds to a maximum detectable distance and for outputting a signal $S_6$ corresponding thereto; and (b) an OR gate one input terminal of which is connected to said delay circuit, the other input terminal of which is connected to said waveform shaper, and the output terminal of which is connected to the reset terminal R of said flip-flop, said OR gate ORing the signal $S_5$ from said waveform shaper and the signal $S_6$ from said delay circuit and for resetting said flip-flop when said delay circuit outputs the signal $S_6$ or when said waveform shaper outputs the signal $S_5$, whereby said obstruction sensor is reset each time no obstruction is detected before the next ultrasonic pulse signal is transmitted from said ultrasonic pulse generator.

9. A safe remote-control door opening-and-closing device for an automotive vehicle as set forth in claim 3, wherein said obstruction sensor further comprises:

(a) a lamp driver connected to said obstruction determination means for outputting a lamp driving signal when said obstruction determination means determines that there is an obstruction within the warning range near the vehicle; and (b) a lamp connected to said lamp driver, said lamp being lighted up in response to the lamp driving signal from said lamp driver.

10. A safe remote-control door opening-and-closing device for an automotive vehicle as set forth in claim 3, wherein said obstruction sensor further comprises:
   (a) a buzzer driver connected to said obstruction determination means for outputting a buzzer driving signal when said obstruction determination means determines that there is an obstruction within the warning range near the vehicle; and
   (b) a buzzer connected to said buzzer driver, said buzzer being actuated in response to the buzzer driving signal from said buzzer driver.

11. A safe remote-control door opening-and-closing device for an automotive vehicle as set forth in claim 5, wherein said ultrasonic pulse transmitter and said ultrasonic pulse receiver are both mounted near a door handle of the vehicle door.

12. A safe remote-control door opening-and-closing device for an automotive vehicle as set forth in claim 5, wherein said ultrasonic pulse transmitter and said ultrasonic pulse receiver are both mounted on a housing of an outside rear-view mirror of the automotive vehicle.

13. A safe remote-control door opening-and-closing device for an automotive vehicle as set forth in claim 3 wherein said vehicle body portion on which said obstruction sensor is mounted remains stationary with respect to said vehicle body as the vehicle door is opened.

14. A safe remote-control door opening-and-closing device for an automotive vehicle, which comprises:
   (a) door opening-and-closing means linked to vehicle doors;
   (b) door driving means for driving said door opening- and closing means;
   (c) door opening switch means for operating said door driving means in the direction that the vehicle doors are opened;
   (d) door closing switch means for operating said door driving means in the direction that the vehicle doors are closed;
   (e) obstruction sensing means for detecting the presence of obstructions within a warning region near the vehicle doors prior to any contact between the obstruction and a vehicle door and outputting a first signal when detecting the absence of obstructions and a second signal when detecting the presence of obstructions; and
   (f) switching means disposed between said door driving means and said door opening switch means, said switching means connecting said door opening switch means to said door driving means in response to the first signal from said obstruction sensing means and disconnecting said door opening switch means from said door driving means in response to the second signal from said obstruction sensing means.

15. A safe remote-control door opening-and-closing device for an automotive vehicle, which comprises:
   (a) door opening-and-closing means linked to vehicle doors;
   (b) door driving means for driving said door opening-and-closing means;
   (c) door opening switch means for operating said door driving means in the direction that the vehicle doors are opened;
   (d) door closing switch means for operating said door driving means in the direction that the vehicle doors are closed;
   (e) obstruction sensing means for detecting the presence of obstructions within a warning region near the vehicle doors to any contact between the obstruction and a vehicle door and outputting a first signal when detecting the absence of obstructions and a second signal when detecting the presence of obstructions; and
   (f) switching means disposed between said door driving means and said door opening switch means, said switching means connecting said door opening switch means to said door driving means in response to the first signal from said obstruction sensing means and connecting said door opening switch means in parallel with said door closing switch means in response to the second signal from said obstruction sensing means.

* * * * *